United States Patent
Lee (10) Patent No.: US 11,309,600 B2
(45) Date of Patent: Apr. 19, 2022

(54) BATTERY MODULE WITH IMPROVED HEAT DISSIPATION, BATTERY PACK INCLUDING THE BATTERY MODULE AND VEHICLE INCLUDING THE BATTERY PACK

(71) Applicant: LG ENERGY SOLUTION, LTD., Seoul (KR)

(72) Inventor: Han-Young Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/049,854

(22) PCT Filed: Nov. 7, 2019

(86) PCT No.: PCT/KR2019/015084
§ 371 (c)(1),
(2) Date: Oct. 22, 2020

(87) PCT Pub. No.: WO2020/111564
PCT Pub. Date: Jun. 4, 2020

(65) Prior Publication Data
US 2021/0257693 A1     Aug. 19, 2021

(30) Foreign Application Priority Data

Nov. 29, 2018 (KR) .................. 10-2018-0151276

(51) Int. Cl.
*H01M 10/613* (2014.01)
*H01M 10/647* (2014.01)
(Continued)

(52) U.S. Cl.
CPC ..... *H01M 10/6572* (2015.04); *H01M 10/613* (2015.04); *H01M 10/625* (2015.04);
(Continued)

(58) Field of Classification Search
None
See application file for complete search history.

(56) References Cited

U.S. PATENT DOCUMENTS

| 7,737,661 B2 | 6/2010 | Chang et al. |
| 2005/0029990 A1* | 2/2005 | Tsukamoto ........... H01M 10/44 320/135 |

(Continued)

FOREIGN PATENT DOCUMENTS

| DE | 11 2016 002 619 T5 | 4/2018 |
| JP | 8-83630 A | 3/1996 |

(Continued)

OTHER PUBLICATIONS

International Search Report for PCT/KR2019/015084 dated Feb. 25, 2020.

(Continued)

*Primary Examiner* — Amanda J Barrow
(74) *Attorney, Agent, or Firm* — Birch, Stewart, Kolasch & Birch, LLP (57) ABSTRACT

A battery module increases heat dissipation by causing electronic cooling to occur at a breakdown voltage or higher, a battery pack including the battery module and a vehicle including the battery pack. The battery module includes a battery cell assembly having a plurality of battery cells and lead junction parts in which respective leads of the battery cells are joined to each other includes a thermoelectric device in which a heat absorbing portion is located on surfaces of the battery cells which are located at both outsides among the battery cells in the battery cell assembly, which correspond to a side surface of the battery cell assembly; and a constant voltage device configured to divert a current of the battery module to the thermoelectric device when an overcharge of the battery module occurs, to elec- (Continued)

tronically cool the battery module when the overcharge of the battery module occurs.

12 Claims, 10 Drawing Sheets

(51) Int. Cl.
*H01M 10/6551* (2014.01)
*H01M 10/625* (2014.01)
*H01M 10/6572* (2014.01)
(52) U.S. Cl.
CPC ..... *H01M 10/647* (2015.04); *H01M 10/6551* (2015.04); *H01M 2220/20* (2013.01)

(56) References Cited

U.S. PATENT DOCUMENTS

| | | | | |
|---|---|---|---|---|
| 2006/0110657 | A1* | 5/2006 | Stanton | H01M 10/121 429/120 |
| 2011/0048485 | A1* | 3/2011 | Goff | H01M 50/20 136/203 |
| 2011/0287285 | A1* | 11/2011 | Yoon | B60L 58/27 429/9 |
| 2014/0360207 | A1 | 12/2014 | Choi et al. | |
| 2015/0229011 | A1* | 8/2015 | Gless | B60L 58/26 62/3.2 |
| 2015/0372356 | A1* | 12/2015 | Kossakovski | H01M 10/633 136/201 |
| 2016/0240903 | A1* | 8/2016 | Kossakovski | H01M 10/6551 |
| 2017/0170533 | A1 | 6/2017 | Choi et al. | |
| 2017/0187371 | A1* | 6/2017 | Fabregas | H02H 9/02 |
| 2018/0175271 | A1 | 6/2018 | McBride | |
| 2019/0081293 | A1 | 3/2019 | Hwang | |
| 2020/0044459 | A1* | 2/2020 | Lee | H02J 7/0029 |

FOREIGN PATENT DOCUMENTS

| | | | | |
|---|---|---|---|---|
| JP | 11-284235 A | | 10/1999 | |
| JP | 2005-116442 A | | 4/2005 | |
| KR | 10-2006-0050510 A | | 5/2006 | |
| KR | 10-2011-0015070 A | | 2/2011 | |
| KR | 10-2011-0128639 A | | 11/2011 | |
| KR | 10-2014-0004818 A | | 1/2014 | |
| KR | 10-2016-0006000 | * | 1/2016 | ........ H01M 10/6572 |
| KR | 10-2016-0006000 A | | 1/2016 | |
| KR | 10-2016-0131627 A | | 11/2016 | |
| KR | 10-1734717 B1 | | 5/2017 | |
| KR | 10-2017-0113903 A | | 10/2017 | |
| KR | 10-2018-0116707 | * | 10/2018 | ............... H02J 7/00 |
| WO | WO 2018/194249 | * | 10/2018 | ............... H02J 7/00 |
| WO | WO 2018/194249 A1 | | 10/2018 | |

OTHER PUBLICATIONS

Extended European Search Report for European Application No. 19891450.9, dated Oct. 1, 2021.

* cited by examiner

BATTERY MODULE WITH IMPROVED HEAT DISSIPATION, BATTERY PACK INCLUDING THE BATTERY MODULE AND VEHICLE INCLUDING THE BATTERY PACK

TECHNICAL FIELD

The present disclosure relates to a battery module, and more particularly to a battery module that improves heat dissipation by causing electronic cooling to occur at a specific voltage or higher. The present disclosure also relates to a battery pack including the battery module and a vehicle including the battery pack. The present application claims priority to Korean Patent Application No. 10-2018-0151276 filed on Nov. 29, 2018 in the Republic of Korea, the disclosures of which are incorporated herein by reference.

BACKGROUND ART

Currently commercialized secondary batteries include nickel cadmium batteries, nickel hydrogen batteries, nickel zinc batteries, lithium secondary batteries, and the like. Among these secondary batteries, because lithium secondary batteries have almost no memory effect compared to nickel-based secondary batteries, lithium secondary batteries are in the spotlight owing to the advantages of free charge and discharge, very low self discharge rate, and high energy density.

Such a lithium secondary battery mainly uses lithium-based oxides and carbon materials as positive electrode active materials and negative electrode active materials, respectively. The lithium secondary battery includes an electrode assembly that assembles a unit cell having a structure in which a positive electrode plate having a positive electrode active material coated on a positive electrode current collector and a negative electrode plate having a negative electrode active material coated on a negative electrode current collector are arranged with a separator interposed therebetween, and a sheath material, that is, a battery case, that seals and accommodates the assembly together with an electrolyte solution. According to the shape of the battery case, lithium secondary batteries are classified into can type secondary batteries in which the electrode assembly is embedded in a metal can and pouch type secondary batteries in which the electrode assembly is embedded in an aluminum laminated sheet pouch.

Recently, secondary batteries are widely used not only in small devices such as portable electronic devices but also in medium and large devices such as vehicles and energy storage systems (ESSs). When secondary batteries are used in such medium and large devices, a large number of secondary batteries are electrically connected to form a battery module or a battery pack in order to increase capacity and output power. In particular, pouch type battery cells are widely used in such medium and large devices because of advantages such as easy lamination and light weight. Pouch type battery cells have a structure in which an electrode assembly to which an electrode lead is connected is accommodated in a pouch case with an electrolyte solution and sealed. A part of the electrode lead is exposed outside the pouch case, and the exposed electrode lead is electrically connected to a device to which pouch type battery cells are mounted or is used to electrically connect pouch type battery cells to each other.

Meanwhile, lithium secondary batteries have a risk of explosion when overheated. In particular, as lithium secondary batteries are applied to electric vehicles including electric vehicles (EVs), hybrid electric vehicles (HEVs), plug-in hybrid electric vehicles (PHEVs), etc., in battery modules or battery packs that connect and use a large number of high capacity battery cells, a major accident may occur when an explosion occurs, and thus securing safety is one of main solutions. Conventionally, a positive temperature coefficient (PTC) device, a fuse, etc. have been proposed as a means of preventing explosion by blocking current when the temperature inside the secondary battery rises. However, they have a problem in that a separate mounting space is required in a battery module or a battery pack.

Currently, medium and large battery modules integrating pouch type battery cells are not mounted with a current interrupt device (CID) and safety enhancement mechanism. In the case of the CID mounted in the existing small cylindrical secondary battery, the safety of the cell is secured by the principle of disconnecting a certain part when the internal voltage of the cell rises and blocking a passage of current through the cell any more. However, there is a problem that the resistance is high to apply the CID to pouch type battery cells in medium and large battery modules. In the case of the CID applied to medium and large prismatic battery cells, the safety of the cell is secured by forcibly generating an external short when the internal voltage of the cell rises, melting the lead inside the cell, and blocking the passage of current. However, the CID of this principle has a problem that the CID operates even when the cell enters the end of life (EOL) period and thus the internal pressure of the cell rises. In addition, there is a problem that it is difficult to apply the CID to pouch type battery cells of medium and large battery modules due to the pouch deformation.

Securing safety is very important in that explosion of a battery module or a battery pack not only may cause damage to electronic devices or vehicles, etc., to which it is employed, but also may lead to the safety threat of users and ignition. If the secondary battery is overheated, the risk of explosion and/or ignition increases, and sudden combustion or explosion due to overheating may cause injury to people and property. Therefore, there is a demand for introducing means for sufficiently securing safety in use of secondary batteries.

DISCLOSURE

Technical Problem

The present disclosure is designed to solve the problems of the related art, and therefore the present disclosure is directed to solving the safety problem due to heat accumulation by improving heat dissipation, rather than applying a safety enhancement mechanism such as a CID or a PTC device in a medium and large battery modules integrating a pouch type battery cell.

The present disclosure is directed to providing a battery module that improves heat dissipation by causing electronic cooling to occur at a specific voltage or higher, a battery pack including the battery module, and a vehicle including the battery pack.

Technical Solution

In one aspect of the present disclosure, there is provided a battery module including a battery cell assembly comprising a plurality of battery cells and at least one lead junction part in which respective leads of two battery cells of the plurality of battery cells are joined to each other, including at least one thermoelectric device in which a heat absorbing portion is located on a surface of a first battery cell of the plurality of battery cells, the surface of the first battery cell corresponding to a side surface of the battery cell assembly; and a constant voltage device configured to bypass a current of the battery module to the at least one thermoelectric device when an overvoltage of the battery module occurs, and the at least one thermoelectric device may be driven to electronically cool the battery cell assembly of the battery module when the overvoltage of the battery module occurs.

The constant voltage device may be mounted onto the at least one lead junction part.

The constant voltage device may be connected in parallel between a positive electrode lead of the first battery cell of the plurality of battery cells and a negative electrode lead of a second battery cell of the plurality of battery cells.

The constant voltage device may be a Zener diode or a varistor.

A breakdown voltage of the constant voltage device may be greater than a full charge voltage of the battery module.

The constant voltage device may be provided in a sensing circuit that senses a voltage state of the battery module, and a circuit capable of allowing the current of the battery module to flow toward the at least one thermoelectric device when the breakdown voltage of the constant voltage device is reached may be provided between the constant voltage device and the at least one thermoelectric device.

The battery cells may be pouch type battery cells.

The at least one thermoelectric device may be plate shaped.

The battery module may further include a plurality of heat dissipation fins protruding on the at least one thermoelectric device in a direction perpendicular to the side surface of the battery cell assembly.

The battery module may further include an end plate covering the side surface of the battery cell assembly, and grooves into which the heat dissipation fins are fitted may be formed in the end plate.

In another aspect of the present disclosure, there is provided a battery pack including at least one battery module according to the present disclosure; and a pack case configured to package the at least one battery module.

In another aspect of the present disclosure, there is provided a vehicle including at least one battery pack according to the present disclosure.

Advantageous Effects

The battery module according to the present disclosure further includes a constant voltage device and a thermoelectric device. By using the constant voltage device capable of allowing a current to flow in a desired direction at a breakdown voltage or higher, when overvoltage of the battery module occurs, the flow of the current is diverted to the thermoelectric device through the constant voltage device. By driving the thermoelectric device and electronically cooling the battery module using the diverted current, it is possible to prevent a phenomenon that the temperature of the battery module rapidly increases due to occurrence of overvoltage.

In the present disclosure, in particular, the thermoelectric device is mounted onto the surface of battery cells located on both outsides of the battery cells in a battery cell assembly. By doing in this way, cooling of a part with a comparatively large area is possible preferentially, and the heat dissipation effect is excellent. In addition, because electronic cooling takes place in the outside battery cell, heat dissipation to the outside becomes easier and the cooling effect is excellent.

Furthermore, it is advantageous to maximize the effect of electronic cooling by increasing the heat dissipation surface area such as applying a heat dissipation fin structure to the thermoelectric device toward an end plate. In addition, the constant voltage device and the thermoelectric device may be disposed at a short distance, and thus a structure of the battery module may be simplified.

In the present disclosure, heat dissipation fins are additionally provided in the thermoelectric device, and grooves into which the heat dissipation fins are inserted are formed in the end plate, thereby achieving the structure in which the end plate not only accommodates and supports the battery cell assembly but also supports the thermoelectric device and the heat dissipation fins together. Heat dissipation may be further smooth as a result of expanding a heat dissipation area according to the addition of heat dissipation fins and structural robustness may be ensured because the end plate fixes the heat dissipation fins.

According to the present disclosure, heat accumulation in the battery module may be prevented by sending the current to the thermoelectric device to cause an endothermic reaction when an overvoltage occurs and cooling battery cells. Therefore, overheating of the battery module may be prevented, and safety of the battery module is excellent.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
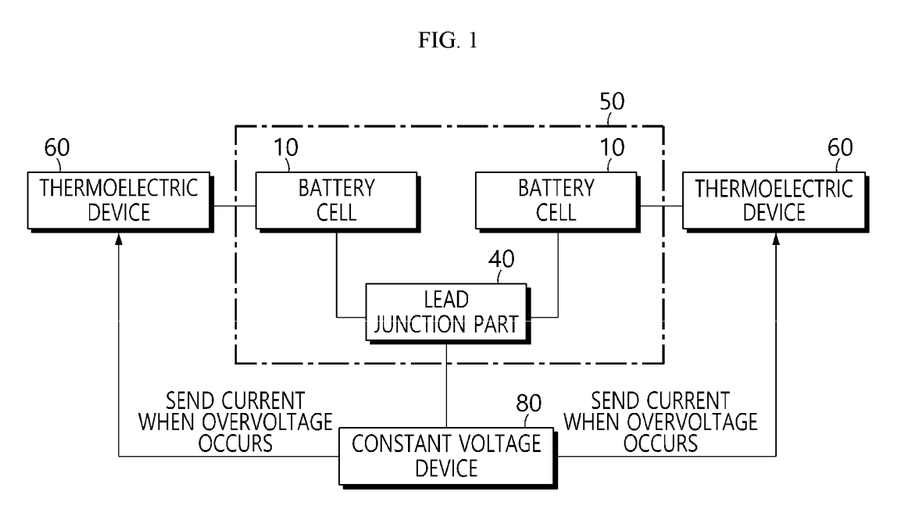
FIG. 1 is a block diagram illustrating a battery module according to an embodiment of the present disclosure.

FIG. 1 is a block diagram illustrating a battery module according to an embodiment of the present disclosure. Referring to FIG. 1, the battery module according to the present disclosure includes a battery cell assembly 50 including a plurality of battery cells 10, a thermoelectric device 60, and a constant voltage device 80.

A general battery module includes only the plurality of battery cells 10. The battery module according to the present disclosure further includes the thermoelectric device 60 and the constant voltage device 80.

The battery cell assembly 50 has a structure in which side surfaces of the plurality of battery cells 10 are arranged to be adjacent to each other. At this time, the thermoelectric device 60 has a heat absorbing portion located on the surface of the battery cells 10 which are located at both outsides among the battery cells 10 in the battery cell assembly 50, which correspond to the side surface of the battery cell assembly 50.

As will be described in more detail below, the battery cells 10 have respective leads joined to each other to form lead junction parts 40. The constant voltage device 80 may be mounted onto the lead junction part 40.

The constant voltage device 80 diverts the current of the battery module to the thermoelectric device 60 when overvoltage of the battery module occurs. The constant voltage device 80 is a device capable of allowing the current to flow in a desired direction at a breakdown voltage or higher. The constant voltage device 80 has a characteristic that allows the current to flow rapidly when a voltage equal to or greater than the breakdown voltage is applied between both terminals. That is, the constant voltage device 80 provided in the present disclosure is a device capable of diverting, i.e. bypassing, the current at the breakdown voltage or higher, and means a device that blocks the current at a voltage lower than the breakdown voltage and allows the current to flow rapidly at a voltage higher than the breakdown voltage. Therefore, in the present disclosure, a necessary circuit may be configured using the constant voltage device 80 such that the current flows to the thermoelectric device 60 at the breakdown voltage of the constant voltage device 80 or higher. A specific value of the breakdown voltage may be appropriately adjusted by those skilled in the art as necessary. In the present disclosure, it is not necessary to use the constant voltage device 80 whose breakdown voltage is higher than needed. The maximum value of the breakdown voltage is different for each battery module.

The constant voltage device 80 may be applied to the battery module according to the present disclosure to divert the current during overvoltage to the thermoelectric device 60 and drive the thermoelectric device 60. By protecting the battery module from overheating or heat accumulation, the safety of the battery module may be improved.

The thermoelectric device 60 is driven by the diverted current. The thermoelectric device 60 is configured as a Peltier device capable of absorbing and generating heat by current supply. If a heat absorbing portion of the Peltier device is oriented toward the surface of the battery cells 10 located at both outsides among the battery cells 10 inside the battery cell assembly 50 and a heat generating portion of the Peltier device is oriented toward the air, the thermoelectric device 60 may perform electronic cooling by current supply.

As is well known, the Peltier device includes the heat absorbing portion and the heat generating portion. In the present disclosure, the heat absorbing portion is in contact with the surface of the battery cells 10 located at both outsides among the battery cells 10 inside the battery cell assembly 50 and the heat generating portion is exposed to the air. The Peltier effect refers to a phenomenon in which when any kind of metal is paired to flow the current, a contact of one side generates heat and a contact of the other side absorbs (cools) heat. The thermoelectric device 60 of the present disclosure is a device implementing such a Peltier effect, and generally connects n-type and p-type semiconductors formed of an alloy of Group V-VI and a solid solution thereof as cooling contacts through a copper plate at present. If the direction in which the current flows changes, heat absorbing and generating portions may be switched to each other, and the amount of heat absorption and generation may be adjusted according to the amount of current.

In the present disclosure, the current flow direction applied to the thermoelectric device 60 is considered such that the heat absorbing portion of the thermoelectric device 60 is in contact with the surface of the battery cells 10 located at both outsides among the battery cells 10 inside the battery cell assembly 50 and the heat generating portion is exposed to the air. By mounting the thermoelectric device 60 onto the side surface of the battery cell assembly 50 other than the inside of the battery cell 10 or another position within the battery module, preferential cooling of a part with a relatively large area is possible, resulting in the excellent heat dissipation effect. In addition, because electronic cooling takes place in the outside battery cells, heat dissipation to the outside becomes easier and the cooling effect is excellent. In addition, the constant voltage device 80 and the thermoelectric device 60 may be disposed at a short distance, and thus a structure of the battery module may be simplified.

As described above, in the present disclosure, when the overvoltage occurs, the battery module is electronically cooled by driving the thermoelectric device 60 using the current of the battery module. As a result, a phenomenon in which the temperature of the battery module increases rapidly due to overvoltage may be prevented.

Figure 2:
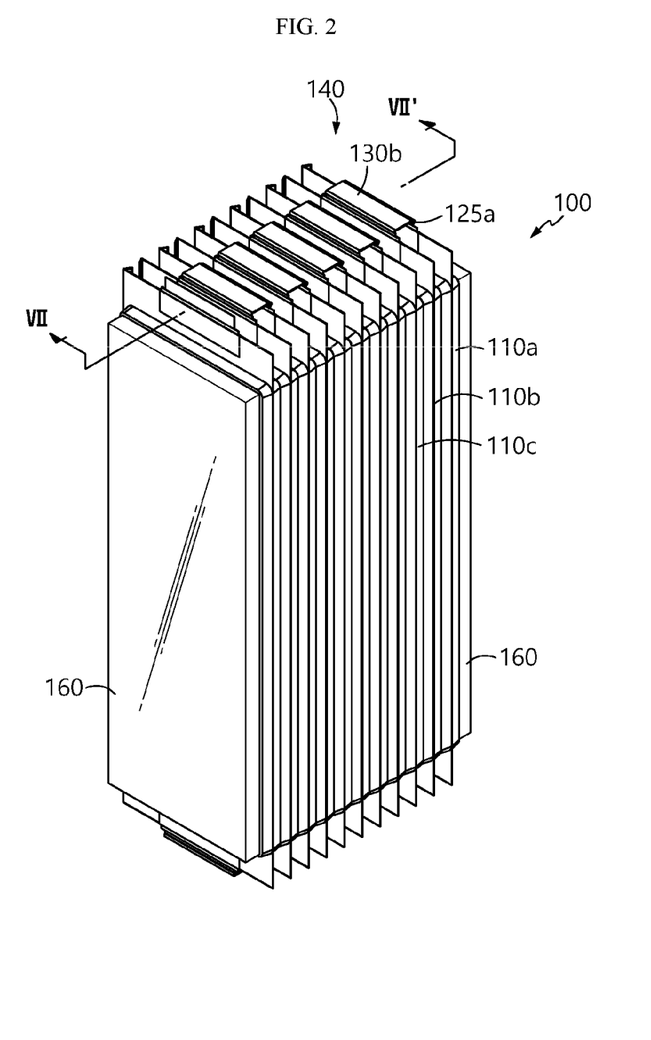
FIG. 2 is a perspective view schematically showing a battery module according to another embodiment of the present disclosure.
Figure 3:
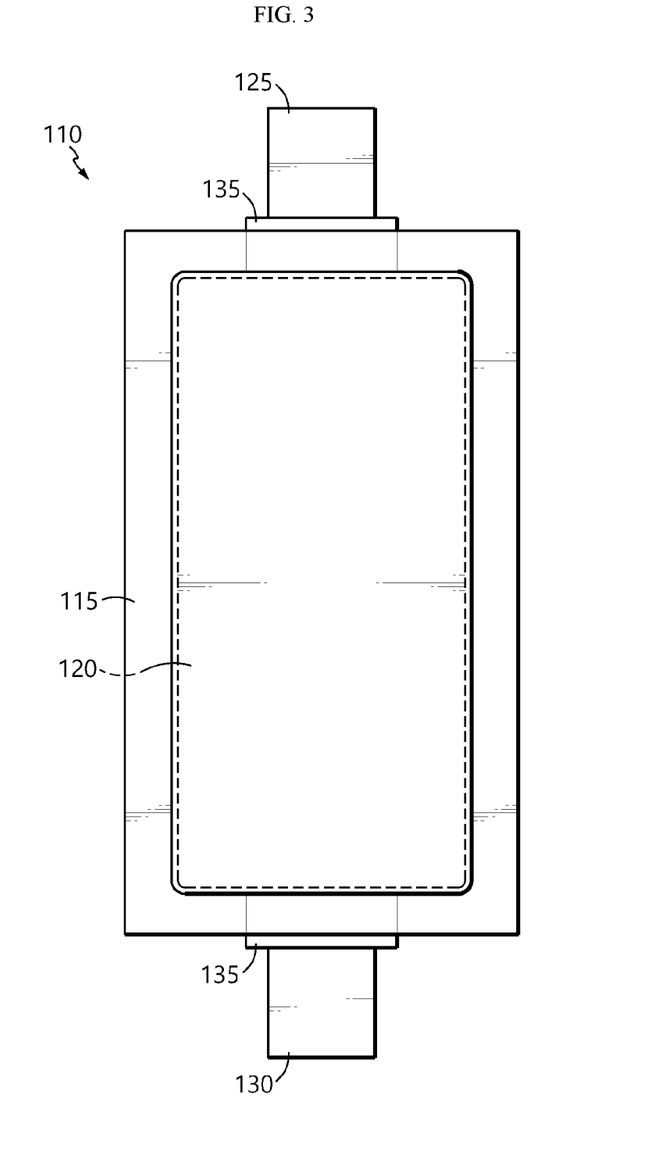
FIG. 3 is a top view of a pouch type battery cell as a unit battery cell included in the battery module of FIG. 2.

FIG. 2 is a perspective view schematically showing a battery module according to another embodiment of the present disclosure. FIG. 3 is a top view of a pouch type battery cell as a unit battery cell included in the battery module of FIG. 2.

The battery module 100 of FIG. 2 illustrates an example in which a plurality of battery cells 110a, 110b, 110c, etc. are electrically connected in series. In the present embodiment, an example of a serial connection is given, but battery cells may be connected in series and/or in parallel according to a desired standard. Each of the plurality of battery cells 110a, 110b, 110c, etc. is a pouch type battery cell 110 as shown in FIG. 3 and may have the same structure.

Referring to FIG. 3, the pouch type battery cell 110 is accommodated and sealed in a pouch 115 together with electrode assembly 120 and an electrolyte. The pouch 115 may include a metal layer, an outer resin layer, and an inner resin layer so as to seal the electrode assembly 120 and the electrolyte accommodated therein and protect the electrode assembly 120 and the electrolyte from the outside.

One end portion of each of plate shaped positive electrode lead 125 and negative electrode lead 130 is connected to both ends of the electrode assembly 120, and the other end portion thereof is exposed to the outside of the pouch 115. One end portion of the positive electrode lead 125 is electrically connected to a positive electrode plate of the electrode assembly 120, and one end portion of the negative electrode lead 130 is electrically connected to a negative electrode plate of the electrode assembly 120. The other end portions of the electrode leads 125 and 130 exposed to the outside of the pouch 115 are used to electrically connect a plurality of pouch type battery cells as shown in FIG. 2.

A lead film 135 is interposed between the pouch 115 and the electrode leads 125 and 130. The lead film 135 is provided to further improve the adhesiveness between the pouch 115 and the electrode leads 125 and 130. The lead film 135 may not only prevent a short circuit between the electrode leads 125 and 130 and the metal layer of the pouch 115 may but also improve the sealing property of the pouch 115. Thermal welding of the electrode leads 125 and 130 of a metal material and the pouch 115 of a polymer material may cause a somewhat large contact resistance, the surface adhesion may deteriorate. However, as in the above embodiment, when the lead film 135 is provided, such a phenomenon of deterioration of adhesion may be prevented. In addition, the lead film 135 may be an insulating material to preferably block the application of current from the electrode leads 125 and 130 to the pouch 115. The lead film 135 includes a film having insulation property and thermal welding property. The lead film 135 may include any one or more material layers (a single film or a multiple film) selected from, for example, polyimide (PI), polypropylene, polyethylene, polyethylene terephthalate (PET), etc.

The electrode assembly 120 assembles a unit cell having a structure in which a positive electrode plate and a negative electrode plate are disposed with a separator interposed therebetween. The unit cell may be simply stacked, stacked and folded, or manufactured into an electrode assembly in the form of a jelly roll. A method of manufacturing an electrode assembly in various types is widely known, and thus a detailed description thereof will be omitted. For example, the electrode assembly 120 may be formed by stacking a negative electrode plate, a separator, and a positive electrode plate. The electrode assembly 120 may be in the form of a monocell including negative electrode plate/separator/positive electrode plate or a bicell including negative electrode plate/separator/positive electrode plate/separator/negative electrode plate or positive electrode plate/separator/negative electrode plate/separator/positive electrode plate. In the present embodiment, an example of a bidirectional battery in the form in which the positive electrode lead 125 and the negative electrode lead 130 are drawn from the pouch 115 in opposite directions is given, but a unidirectional cell in the form in which both the positive electrode lead 125 and the negative electrode lead 130 are drawn from the pouch 115 in one direction is not excluded.

Referring to FIGS. 2 and 3 together, the battery cells 110a and 110b are stacked such that the electrode leads protrude from both ends thereof, and the electrode leads have opposite polarities, for example, the positive electrode lead 125a of the battery cell 110a is placed side by side with the negative electrode lead 130b of the battery cell 110b. That is, several battery cells are stacked alternately such that electrode leads placed side by side have opposite polarities.

There may be various ways in which the battery cells 110a, 110b, 110c, etc. are connected in series. In FIG. 2, a configuration in which the other end portions of the electrode leads 125a and 130b are folded and bent in a left or right side to provide a flat contact surface and then overlap to each other and are connected through welding is illustrated.

In FIG. 2, a total number of 11 battery cells are included to configure the battery cell assembly 150. The electrode leads of each battery cell are vertically bent such that the electrode leads of the neighboring battery cells and the vertically bent portions overlap each other to form the lead junction parts 140. More specifically, in one side of the stacked battery cells 110a, 110b, 110c, etc. the inside electrode leads except for the electrode leads positioned outside are bent to overlap each other, and then bent electrode lead portions are electrically connected. On the other side of the stacked battery cells 110a, 110b, 110c, etc. all the electrode leads are bent to overlap each other and then welded and bent electrode lead portions are electrically connected. Meanwhile, the battery cells may be stacked without an intermediate medium structure such as a cartridge or a spacer, or may be stacked with each other in a structure in which, for example, the battery cells are stacked in a cartridge including a battery cell accommodation part formed in two units.

In FIG. 2, the battery cells 110a, 110b, 110c, etc. are stacked upright in a vertical direction. When the electrode leads are bent, in the battery cells, the electrode lead of any one side is vertically bent in the right direction (or the outside of the battery module), and the electrode lead of the other side is vertically bent in the left direction (or the inside of the battery module). Accordingly, the lead junction part 140 to be coupled is 'E' shaped such that the electrode leads of different polarities are bent and overlapped. And, the lead junction parts 140 are arranged side by side along a horizontal direction. This process may be performed in the reverse process, for example, the electrode leads may be first bent, the battery cells are stack in a state where the electrodes leads are bent, and then the corresponding parts may be welded.

Meanwhile, although FIG. 2 illustrates a method of overlapping and directly connecting the electrode leads, an indirect connection method using a bus bar is also possible. For example, it is apparent that the present disclosure may be applied to a case in which a battery module is configured by welding a bus bar together with an electrode lead or a battery module is configured by welding an electrode lead and an external circuit.

Figure 4:
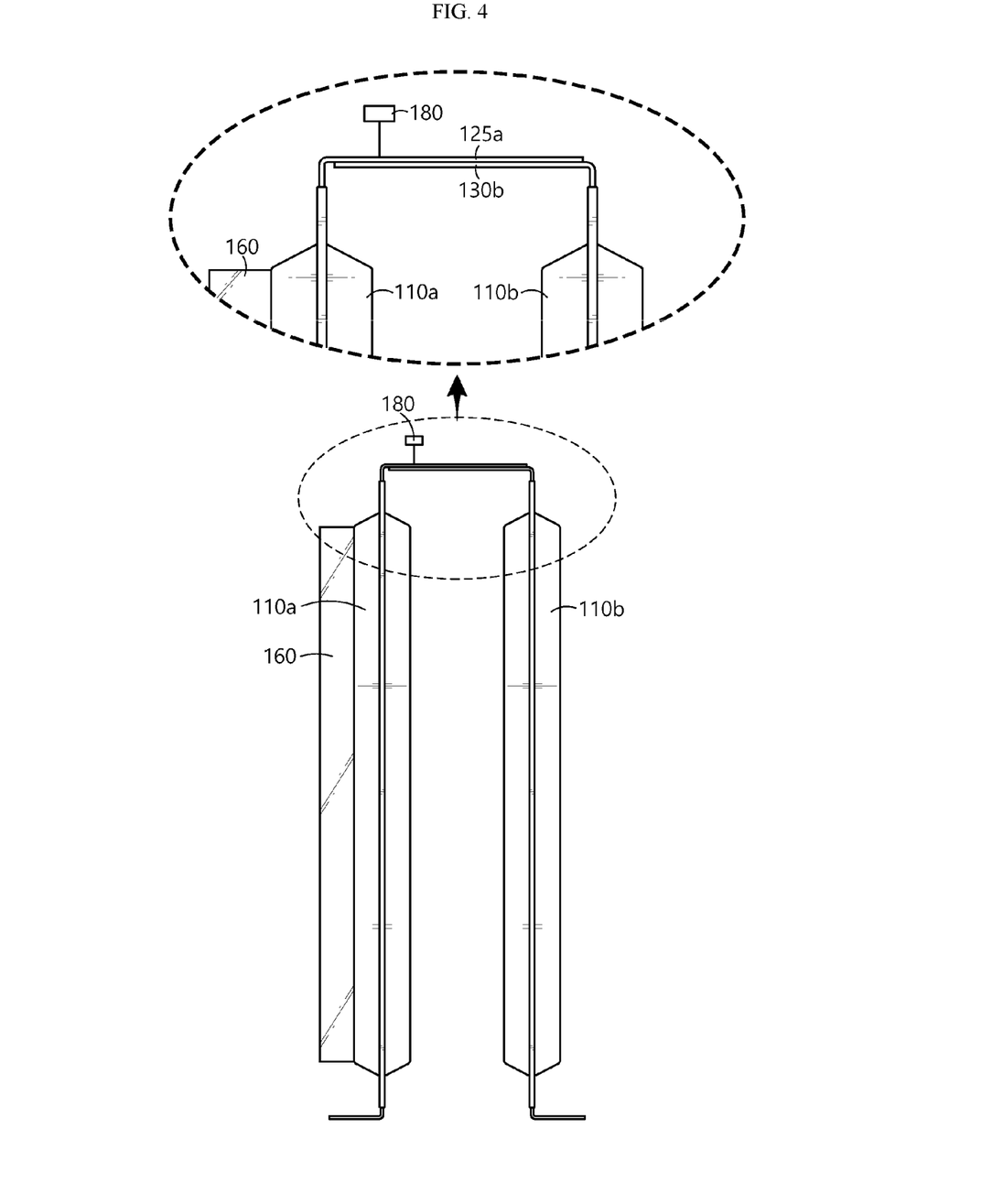
FIG. 4 schematically illustrates lead junction parts between two adjacent battery cells in the battery module of FIG. 2.

FIG. 4 schematically illustrates lead junction parts between two adjacent battery cells in a battery module of FIG. 2.

Referring to FIG. 2 and FIG. 4 together, when two adjacent battery cells in the battery module 100 are referred to as the first battery cell 110a and the second battery cell 110b, the positive electrode lead 125a of the first battery cell 110a and the negative electrode lead 130b of the second battery cell 110b are connected. In this way, the first and second battery cells 110a and 110b are electrically connected in electrical series. The connection may be performed by using a method generally used in the art, for example, the battery cells may be coupled and connected by ultrasonic welding, but the present disclosure is not limited thereto. When the first battery cell 110a is a battery cell located outside, the thermoelectric device 160 is mounted onto the surface of the first battery cell 110a as shown.

In the present embodiment, the other end portion of the positive electrode lead 125*a* of the first battery cell 110*a* and the other end portion of the negative electrode lead 130*b* of the second battery cell 110*b* are bent toward each other along the stack direction of the first and second battery cells 110*a* and 110*b*, and the lead junction part 140 is formed to include a flat portion in which bent portions bent and provided in the electrode leads 125*a* and 130*b* are overlapped and welded. A thermoelectric device 160 is mounted onto the flat portion.

As illustrated in FIG. 2, the thermoelectric device 160 is mounted onto the surface of battery cells positioned at both outsides among the battery cells 110*a*, 110*b*, 110*c*, etc. inside the battery cell assembly 150. That is, the thermoelectric device 160 is provided on the side surface of the battery cell assembly 150 and may be provided in a plate shape.

Figure 5:
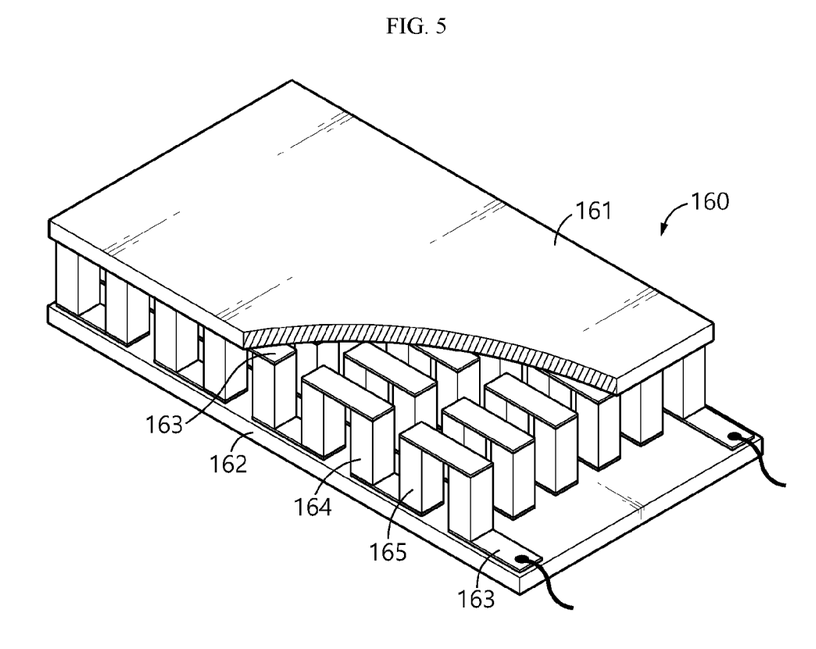
FIG. 5 is a partially cut perspective view illustrating a thermoelectric device included in a battery module according to the present disclosure.
Figure 6:
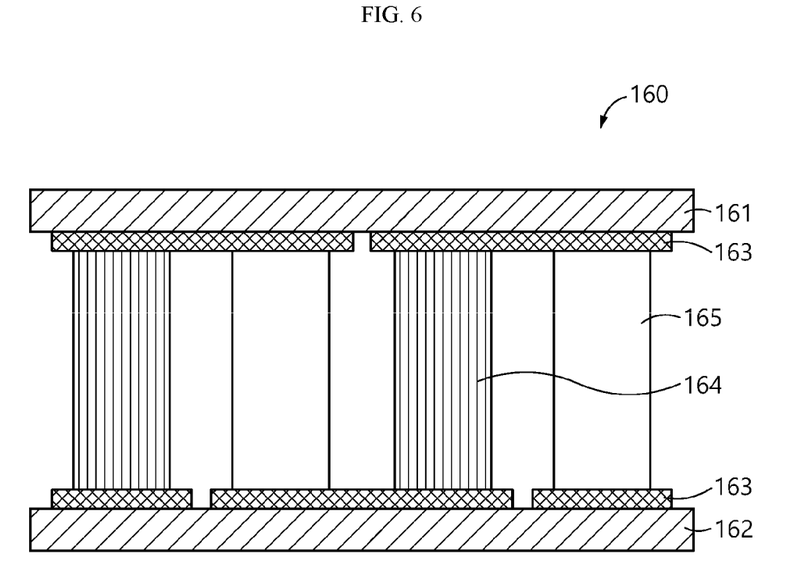
FIG. 6 is a front view of the thermoelectric device shown in FIG. 5.

FIG. 5 is a partially cut perspective view illustrating a thermoelectric device included in a battery module according to the present disclosure. FIG. 6 is a front view of the thermoelectric device shown in FIG. 5. FIGS. 5 and 6 show a thermoelectric module as an example of the thermoelectric device. Since the thermoelectric module may be manufactured in a plate shape, the thermoelectric module may be easily mounted onto the surface of the battery cell.

Referring to FIGS. 5 and 6, the thermoelectric device 160 may include an upper substrate 161 and a lower substrate 162, metal electrodes 163 disposed on one surface of the upper substrate 161 and the lower substrate 162, and a plurality of p-type thermoelectric semiconductors 164 and n-type thermoelectric semiconductors 165 spaced between the metal electrodes 163. The metal electrode 163 allows the current to flow through the p-type thermoelectric semiconductor 164 and the n-type thermoelectric semiconductor 165 when power is applied to the thermoelectric device 160, and more specifically, may include an upper metal electrode provided on the lower surface of the upper substrate 161 and a lower metal electrode provided on the upper surface of the lower substrate 162. The metal electrode 163 may be formed of a material having high electrical conductivity in order to minimize the loss of current supplied to the thermoelectric device 160, and more specifically, may be formed of a material having excellent conductivity such as silver or copper.

The p-type thermoelectric semiconductor 164 and the n-type thermoelectric semiconductor 165 may be spaced apart from each other one by one on one surface of the upper metal electrode and the lower metal electrode. In more detail, the p-type thermoelectric semiconductor 164 may be provided on the left side of the lower surface of the upper electrode, and the n-type thermoelectric semiconductor 165 may be provided spaced to the right side from the p-type thermoelectric semiconductor 164. The n-type thermoelectric semiconductor 165 may be provided on the left side of the upper surface of the lower electrode, and the p-type thermoelectric semiconductor 164 may be provided spaced to the right side from the n-type thermoelectric semiconductor 165.

When the current is applied to the thermoelectric device 160, the p-type thermoelectric semiconductor 164 and the n-type thermoelectric semiconductor 165 are electrically connected in series, and the current flows. Due to the Peltier effect, holes in the p-type thermoelectric semiconductor 164 move with heat toward the (−) side, and electrons in the n-type thermoelectric semiconductor 165 move with heat toward the (+) side, and thus the upper substrate 161 is heated, and the lower substrate 162 is cooled.

Therefore, the lower substrate 162 of the thermoelectric device 160 used in the present disclosure may operate as a heat absorbing portion of the lead junction part 140 in the battery module 100 according to the present disclosure, the upper substrate 161 may operate as a heat generating portion, and accordingly, it is preferable that the lower substrate 162 is configured to be in thermal contact with the surface of the battery cell.

The constant voltage device 180 is an element that drives the thermoelectric device 160 by diverting the current of the battery module 100 to the thermoelectric device 160 when the overvoltage of the battery module 100 occurs to enable cooling, called electronic cooling, of the battery cell as described above. The constant voltage device 180 is a device capable of allowing a current to flow in a desired direction at a breakdown voltage or higher, and preferably includes a Zener diode or a varistor.

The Zener diode is a device using the Zener effect. The Zener effect is a phenomenon that when a high voltage is applied to a semiconductor or the like, because the energy at the upper end of a valence band is the same as the energy at the lower end of a conduction band in a very close part, the tunnel effect increases the probability of electrons moving from the valence band to the conduction band, resulting in flowing a current. In other words, the Zener effect is a phenomenon of increase in the current that appears when the probability that a valence moves to the conduction band by the tunnel effect increases due to any strong electric field generated in the semiconductor. The Zener diode using these characteristics may be manufactured in a semiconductor p-n junction and is well known as a device having a characteristic that when a relatively large voltage in a reverse direction is applied, a large current starts to flow rapidly at a certain voltage and the voltage remains constant.

The varistor is a nonlinear semiconductor resistance device whose resistance value changes according to voltages applied to both ends of the varistor and which is an abbreviation of a variable resistor. Kinds of varistors include symmetric varistors whose resistance is determined only by the magnitude of the voltage regardless of the polarity of the applied voltage, and asymmetric varistors whose resistance varies depending on the polarity of the applied voltage.

Those skilled in the art may configure a necessary circuit by using the constant voltage device 180 such that the current flows to the thermoelectric device 160 at the breakdown voltage of the constant voltage device 180 or higher. When the circuit is configured as described above, the thermoelectric device 160 may be driven in an overvoltage circumstance of the battery module 100 to prevent heat accumulation in the battery module 100.

The breakdown voltage of the constant voltage device 180 is greater than the full charge voltage of the battery module 100. For example, if the full charge voltage is 4.3V, the breakdown voltage may be set to 4.73V which is 10% greater than 4.3V, or 4.945V which is 15% greater than 4.3V, or 5.16V which is 20% greater than 4.3V, to select the constant voltage device 180 corresponding thereto and achieve a circuit configuration. The constant voltage device 180 may be used by obtaining a commercially available one. Constant voltage devices having various breakdown voltages are commercially available, and thus those skilled in the art may purchase and use appropriate constant voltage devices as necessary.

Preferably, the constant voltage device 180 may be provided in a sensing circuit that senses a voltage state of the battery module 100. The normal battery module 100 has a sensing circuit that senses the voltage state and a control circuit that controls charging and discharging of the battery module 100 using the sensed voltage state. In the present disclosure, the battery module 100 may be implemented by further including the constant voltage device 180 in the sensing circuit.

In addition, a circuit must be provided between the constant voltage device 180 and the thermoelectric device 160 to allow the current of the battery module 100 to flow toward the thermoelectric device 160 when the constant voltage device 180 reaches the breakdown voltage. Various circuits for providing a current flow path may be easily implemented by those skilled in the art, and thus detailed descriptions thereof will be omitted.

Preferably, the constant voltage device 180 may connect in parallel the positive electrode lead 125a of any one battery cell, for example, the first battery cell 110a and the negative electrode lead 130b of the other one battery cell, for example, the second battery cell 110b among the lead junction parts 140.

As described above, in the present disclosure, when the overvoltage occurs, the thermoelectric device 160 is driven by using the current of the battery module 100 to electronically cool the battery module 100. As a result, a phenomenon in which the temperature of the battery module 100 increases rapidly due to overvoltage may be prevented.

In the present disclosure, in particular, the thermoelectric device 160 is mounted onto the side surface of the battery cell assembly 150. In this way, collective preferential cooling of a part with a relatively large area is possible, resulting in the excellent heat dissipation effect. In addition, because electronic cooling takes place in the outside battery cells, heat dissipation to the outside becomes easier and the cooling effect is excellent. In addition, the constant voltage device 180 and the thermoelectric device 160 may be disposed at a short distance, and thus a structure of the battery module may be simplified.

Since the battery module according to the present disclosure has no heat accumulation and has excellent safety, the battery module is also suitable for use as a power source for a medium and large device requiring high temperature stability, long cycle characteristics, high rate characteristics, etc. Preferred examples of the medium and large device include a power tool that is driven by an electric motor; electric vehicles including EV, REV, PHEV, and the like; electric motorcycles including e-bikes and e-scooters; electric golf carts; and ESS, but are not limited thereto.

A normal battery module includes a protection circuit to prevent overcharging. The protection circuit interrupts a charge current or a discharge current by blocking a charge/discharge circuit when a voltage (that is, an overcharge circumstance) equal to or higher than a chargeable voltage or a voltage (that is, the overdischarge circumstance) equal to or lower than a dischargeable voltage is detected. In general, although secondary batteries include the battery protection circuit to prevent damage of the secondary battery due to overcharging or overdischarging, because most of secondary batteries include a protection circuit IC or configure a separate complicated overcharge prevention circuit, there is an undesirable problem in terms of cost and efficiency. And when the battery protection circuit does not operate normally, especially when the control of overcharge prevention does not function normally, it is difficult to ensure the safety of the battery module. In addition, the safety is very weak when the battery module does not operate properly due to the malfunction of the protection circuit. The battery module of the present disclosure may greatly improve the heat dissipation characteristics during overvoltage of the battery module regardless of whether the protection circuit is provided, which is a great help in securing safety. In addition, since the constant voltage device of the present disclosure is additionally inserted into the sensing circuit of the existing battery module and constitutes a new circuit, the constant voltage device is easy to utilize. Recently, since the characteristics of an electrolyte and a separator or an electrode structure included in the secondary battery are improved, and predetermined means for preventing overcharging is provided in the electrolyte and the electrode assembly itself, attempts to configure secondary batteries using only bare cells without a protection circuit in terms of the manufacturing cost are increasing. In the present disclosure, a bare cell-based battery module without a protection circuit may be sufficiently utilized as a basic and minimal safety device because the battery module may prevent occurrence of a problem such as heat accumulation during overvoltage with minimal components such as a thermoelectric device and a constant voltage device.

Figure 7:
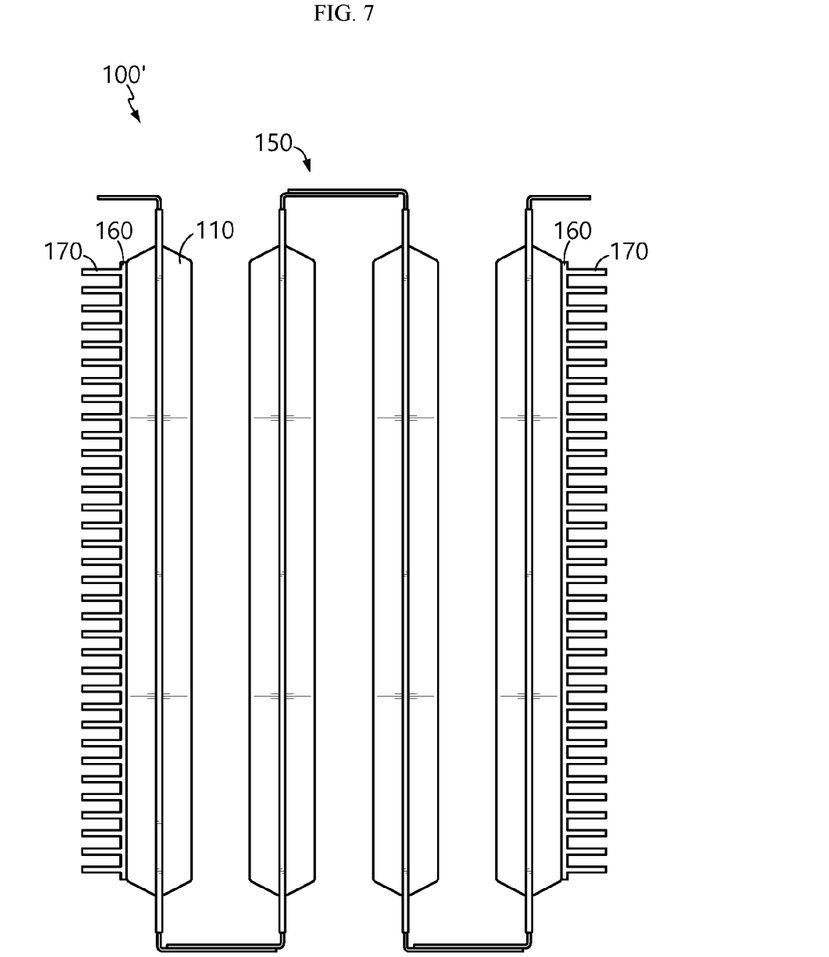
FIG. 7 is a schematic cross-sectional view of another battery module according to the present disclosure and, for example, corresponds to cross-section VII-VII' of FIG. 2.
Figure 8:
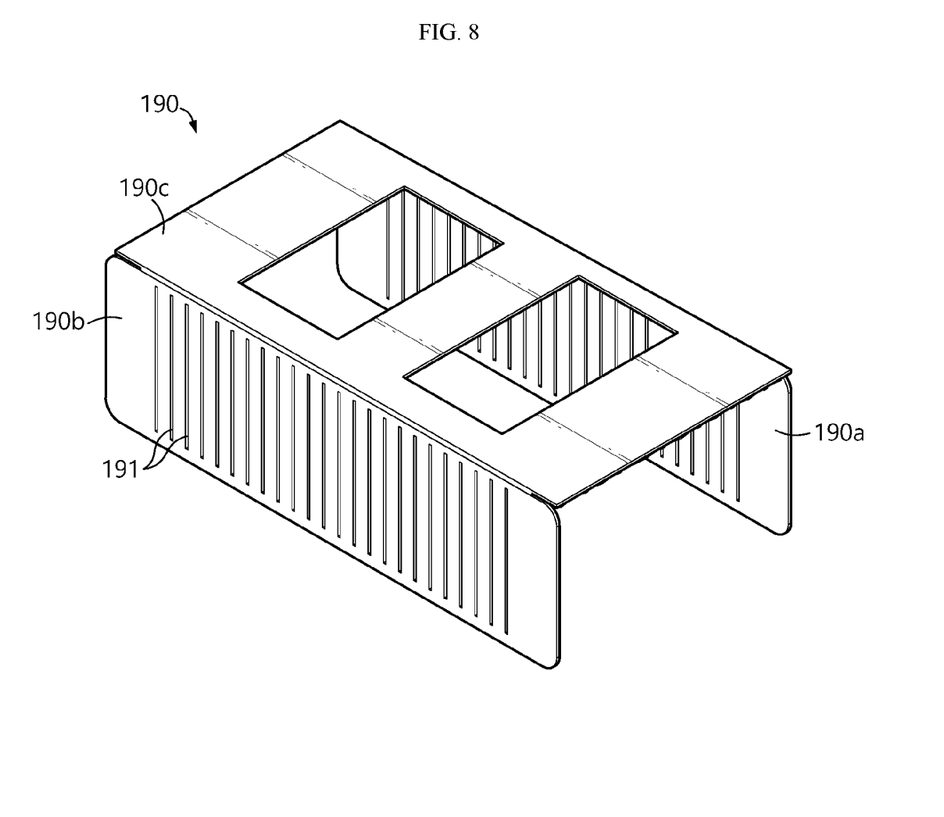
FIG. 8 illustrates an end plate that may be included in the battery module as shown in FIG. 7.
Figure 9:
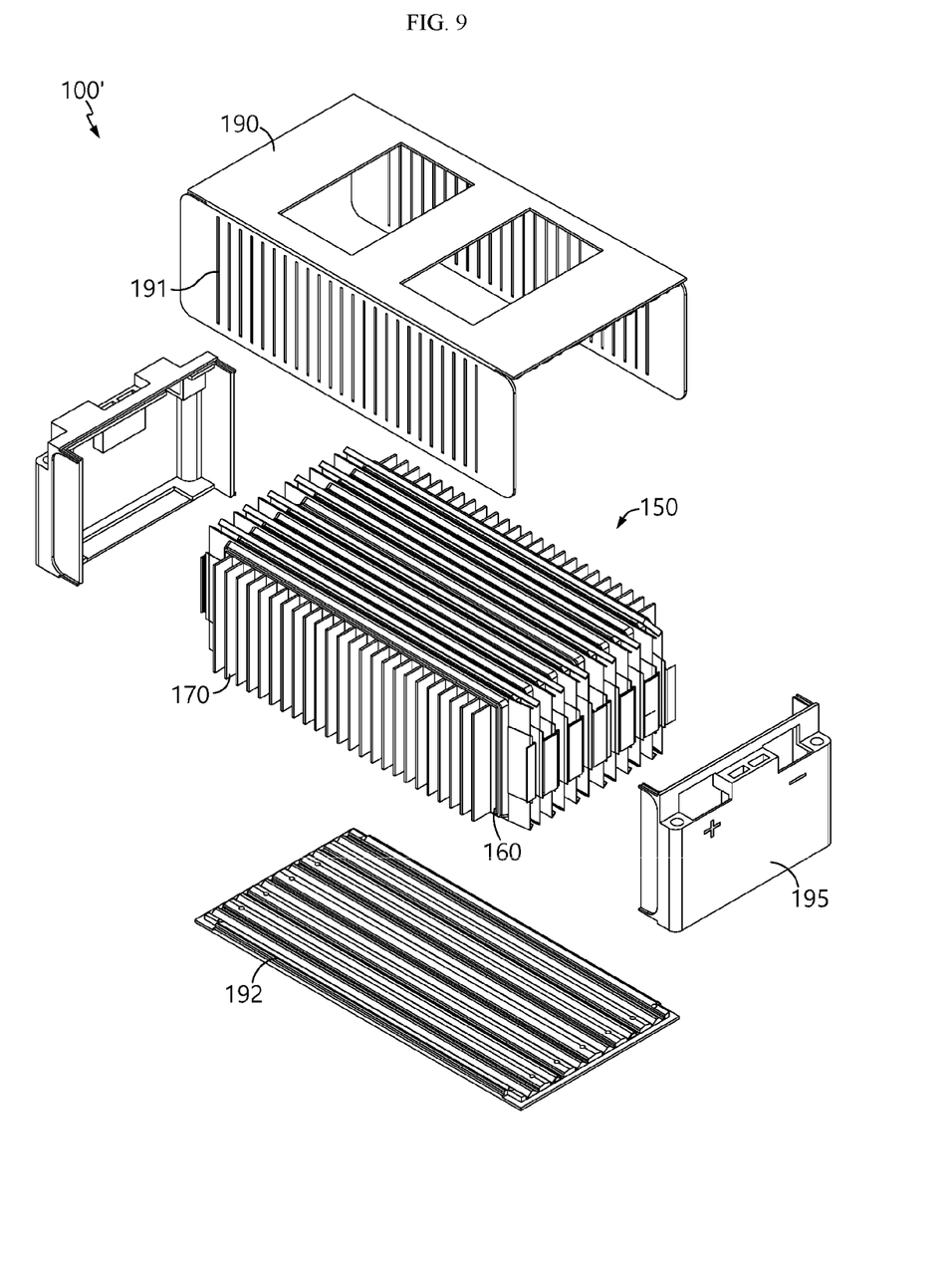
FIG. 9 is an exploded perspective view of a battery module assembled using the end plate of FIG. 8.

FIG. 7 is a schematic cross-sectional view of another battery module according to the present disclosure and, for example, corresponds to cross-section VII-VII' of FIG. 2. For the convenience of illustration, in FIG. 7, an example in which four battery cells are included in the overall configuration of the battery cell assembly 150 is given. FIG. 8 illustrates an end plate that may be included in the battery module as shown in FIG. 7. FIG. 9 is an exploded perspective view of a battery module assembled using the end plate of FIG. 8.

Referring to FIG. 7, as described above, the thermoelectric device 160 is provided in a plate shape on a side surface of the battery cell assembly 150. The thermoelectric device 160 further includes a plurality of heat dissipation fins 170 protruding in a direction perpendicular to the side surface of the battery cell assembly 150. The heat dissipation fins 170 are applied toward the end plate 190 as shown in FIG. 8. During the electronic cooling by the thermoelectric device 150, a heat dissipation surface area further increases by the heat dissipation fins 170, thereby maximizing the effect of the electronic cooling.

A battery module 100' further includes the end plate 190 covering the side surface of the battery cell assembly 150. As shown in FIG. 8, grooves 191 into which the heat dissipation fins 170 are fitted are formed in the end plate 190.

The grooves 191 may have a step enough to accommodate the heat dissipation fins 170 or may be formed to allow the heat dissipation fins 170 to penetrate the grooves 191. It is preferable to prevent the heat dissipation fins 170 from protruding to the outside of the end plate 190 as much as possible to comply with existing design rules.

Referring to FIG. 9, the battery module 100' may further include a module base plate 192, a sub end plate 195, and an end plate 190 in the battery cell assembly 150 as described above.

The battery cell assembly 150 may be mounted onto the module base plate 192.

A bus bar assembly (not shown) that electrically connects the battery cells 110 may be mounted onto each of the front and rear surfaces of the battery cell assembly 150. The bus bar assembly is electrically connected to electrode leads formed on the battery cells 110 in the battery cell assembly 150 to constitute an electrical connection with an external device. A slave battery management system (BMS) (not shown) may be mounted onto one surface of the bus bar assembly and detect the voltage and temperature from the battery cell assembly 150 to control the battery module 100'.

The sub end plates 195 may be mounted onto the outer surfaces of the bus bar assembly and the slave BMS, respectively. The sub end plates 195 prevent the bus bar assembly and the slave BMS from being exposed to the outside.

In the present embodiment, the end plate 190 corresponds to an upper housing to have a structure in which the end plate 190 is mounted onto an upper surface of the battery cell assembly 150, coupled to the module base plate 192, and includes the battery cell assembly 150 therein. The end plates 190 are located at both sides of the battery cell assembly 150 when the battery module 100' is completed.

Referring to FIGS. 8 and 9 together, specifically, the end plate 190 may include a first plate 190a upright downward, a second plate 190b upright downward while being compatible with the first plate 190a and an upper plate 190c covering the upper surface of the battery cell assembly 150. The first plate 190a is in contact with one side of the battery cell assembly 150. The second plate 190b is in contact with the other side of the battery cell assembly 150. The upper plate 190c has a shape extending from the upper edge of the first plate 190a and the upper edge of the second plate 190b.

The grooves 191 are formed in the first plate 190a and the second plate 190b. In consideration of the thickness of the thermoelectric device 160, the thickness of each of the first plate 190a and the second plate 190b is determined such that an overall appearance is not larger than that of the existing end plate, and thus, the overall size of the battery module 100' is not larger than the existing one. During assembly, the heat dissipation fins 170 are fitted into the grooves 191 formed in the end plate 190. The end plate 190 is structured to accommodate and support the battery cell assembly 150 as well as support the thermoelectric device 160 and the heat dissipation fins 170 together. As a result of expanding a heat dissipation area according to the addition of the heat dissipation fins 170, heat dissipation is smoother, and the end plate 190 fixes the heat dissipation fins 170, and thus structural robustness may be secured.

Figure 10:
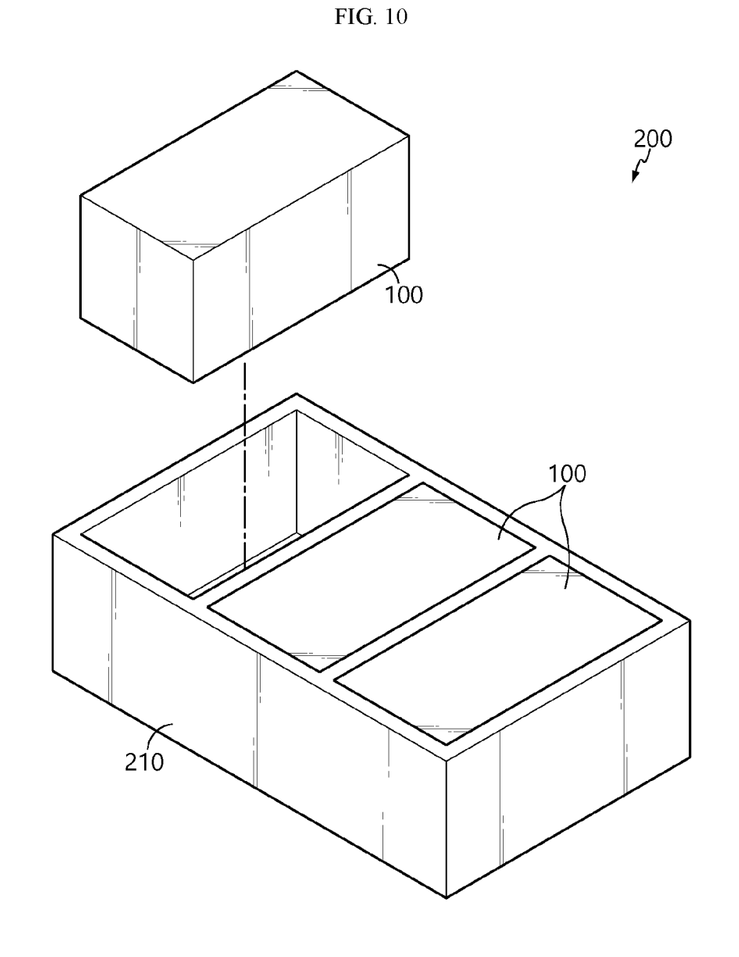
FIG. 10 is a diagram illustrating a battery pack according to still another embodiment of the present disclosure.
Figure 11:
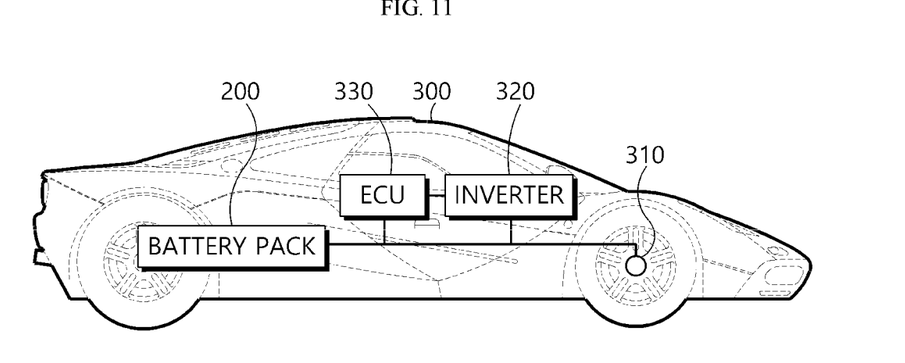
FIG. 11 is a diagram illustrating a vehicle according to still another embodiment of the present disclosure.

FIG. 10 is a diagram illustrating a battery pack according to still another embodiment of the present disclosure. FIG. 11 is a diagram illustrating a vehicle according to still another embodiment of the present disclosure.

Referring to FIGS. 10 and 11, a battery pack 200 may include at least one battery module according to the foregoing embodiment, for example, the battery module 100 of the second embodiment and a pack case 210 for packaging the battery pack 200. In addition, the battery pack 200 according to the present disclosure, in addition to the battery module 100 and the pack case 210, may further include various devices for controlling charging and discharging of the battery module 100, such as a battery management system (BMS), a current sensor, a fuse, etc.

The battery pack 200 may be provided in a vehicle 300 as a fuel source of the vehicle 300. For example, the battery pack 200 may be provided in the vehicle 300 in other ways that may utilize electric vehicles, hybrid vehicles, and the other battery pack 200 as fuel sources.

Preferably, the vehicle 300 may be an electric vehicle. The battery pack 200 may be used as an electric energy source that drives the vehicle 300 by providing a driving force to a motor 310 of the electric vehicle. In this case, the battery pack 200 has a high nominal voltage of 100V or higher. In a hybrid vehicle, the battery pack 200 is set to 270V.

The battery pack 200 may be charged or discharged by an inverter 320 according to the driving of the motor 310 and/or an internal combustion engine. The battery pack 200 may be charged by a regenerative charging device coupled with a break. The battery pack 200 may be electrically connected to the motor 310 of the vehicle 300 through the inverter 320.

As described above, the battery pack 200 also includes the BMS. The BMS estimates the state of battery cells in the battery pack 200 and manages the battery pack 200 using estimated state information. For example, the BMS estimates and manages state information of the battery pack 200 such as state of charge (SOC) of the battery pack 200, state of health (SOH), maximum input/output power allowance, output voltage, etc. In addition, the BMS may use the state information to control the charging or discharging of the battery pack 200, and further, estimate the replacement time of the battery pack 200.

An ECU 330 is an electronic control device for controlling the state of the vehicle 300. For example, the ECU 330 determines torque information based on information such as an accelerator, a brake, a speed, etc., and controls the output of the motor 310 to match the torque information. In addition, the ECU 330 transmits a control signal to the inverter 320 such that the battery pack 200 may be charged or discharged based on the state information such as SOC and SOH of the battery pack 200 received by the BMS. The inverter 320 causes the battery pack 200 to be charged or discharged based on the control signal of the ECU 330. The motor 310 drives the vehicle 300 based on control information (e.g., torque information) transmitted from the ECU 330 using electric energy of the battery pack 200.

The vehicle 300 includes the battery pack 200 according to the present disclosure. The battery pack 200 includes the battery module 100 with improved safety as described above. Therefore, the stability of the battery pack 200 is improved, the battery pack 200 is excellent in stability and may be used for a long time, and thus the vehicle 300 including the battery pack 200 is safe and easy to operate.

In addition, the battery pack 200 may also be provided in other devices, equipment, and facilities, such as an ESS using a secondary battery, in addition to the vehicle 300.

As such, the battery pack 200 according to the present embodiment and devices or equipment and facilities including the battery pack 200, such as the vehicle 300, include the battery module 100 described above, and thus the battery pack 200 having all the advantages owing to the battery module 100 described above and devices or equipment and facilities such as the vehicle 300 including the battery pack 200 may be implemented.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:
1. A battery module, comprising:
   a battery cell assembly comprising:
      a plurality of battery cells and at least one lead junction part in which respective leads of two battery cells of the plurality of battery cells are joined to each other;
      at least one thermoelectric device in which a heat absorbing portion is located on a surface of a first battery cell of the plurality of battery cells, the surface of the first battery cell corresponding to a side surface of the battery cell assembly; and
      a constant voltage device configured to bypass a current of the battery module to the at least one thermoelectric device when an overvoltage of the battery module occurs, wherein the at least one thermoelectric device is driven to electronically cool the battery cell assembly of the battery module when the overvoltage of the battery module occurs, and wherein the constant voltage device is a Zener diode or a varistor.

2. The battery module of claim 1, wherein the constant voltage device is mounted onto the at least one lead junction part.

3. The battery module of claim 2, wherein the constant voltage device is connected in parallel between a positive electrode lead of the first battery cell of the plurality of battery cells and a negative electrode lead of a second battery cell of the plurality of battery cells.

4. A battery module, comprising:
a battery cell assembly comprising:
a plurality of battery cells and at least one lead junction part in which respective leads of two battery cells of the plurality of battery cells are joined to each other;
at least one thermoelectric device in which a heat absorbing portion is located on a surface of a first battery cell of the plurality of battery cells, the surface of the first battery cell corresponding to a side surface of the battery cell assembly; and
a constant voltage device configured to bypass a current of the battery module to the at least one thermoelectric device when an overvoltage of the battery module occurs,
wherein the at least one thermoelectric device is driven to electronically cool the battery cell assembly of the battery module when the overvoltage of the battery module occurs, and
wherein a breakdown voltage of the constant voltage device is greater than a full charge voltage of the battery module.

5. A battery module, comprising:
a battery cell assembly comprising:
a plurality of battery cells and at least one lead junction part in which respective leads of two battery cells of the plurality of battery cells are joined to each other;
at least one thermoelectric device in which a heat absorbing portion is located on a surface of a first battery cell of the plurality of battery cells, the surface of the first battery cell corresponding to a side surface of the battery cell assembly; and
a constant voltage device configured to bypass a current of the battery module to the at least one thermoelectric device when an overvoltage of the battery module occurs,
wherein the at least one thermoelectric device is driven to electronically cool the battery cell assembly of the battery module when the overvoltage of the battery module occurs,
wherein the constant voltage device is provided in a sensing circuit that senses a voltage state of the battery module, and
wherein a circuit capable of allowing the current of the battery module to flow toward the at least one thermoelectric device when a breakdown voltage of the constant voltage device is reached is provided between the constant voltage device and the at least one thermoelectric device.

6. The battery module of claim 1, wherein the at least one thermoelectric device is plate shaped.

7. The battery module of claim 6, further comprising a plurality of heat dissipation fins protruding on the at least one thermoelectric device in a direction perpendicular to the side surface of the battery cell assembly.

8. The battery module of claim 7, further comprising an end plate covering the side surface of the battery cell assembly,
wherein grooves into which the heat dissipation fins are fitted are formed in the end plate.

9. A battery pack comprising:
at least one battery module according to claim 1; and
a pack case configured to package the at least one battery module.

10. A vehicle comprising at least one battery pack according to claim 9.

11. The battery module of claim 1, wherein the least one lead junction part comprises a plurality of lead junction parts, each lead junction part of the plurality of lead junction parts joining two battery cells of the plurality of battery cells to each other.

12. The battery module of claim 1, wherein the at least one thermoelectric device comprises a pair of thermoelectric devices, the pair of thermoelectric devices including a thermoelectric device at a surface of a second battery cell of the plurality of battery cells.

* * * * *